United States Patent [19]

Gonzalez

[11] Patent Number: 4,801,094
[45] Date of Patent: Jan. 31, 1989

[54] FLOW RESTRICTOR

[75] Inventor: Teodoro J. Gonzalez, Canyon Country, Calif.

[73] Assignee: Price Pfister, Inc., Pacoima, Calif.

[21] Appl. No.: 5,913

[22] Filed: Jan. 21, 1987

[51] Int. Cl.4 .............................................. B05B 1/18
[52] U.S. Cl. .................................... 239/553.3; 239/587
[58] Field of Search .................. 239/590, 590.3, 590.5, 239/553, 553.3, 553.5, 587; 138/40; 210/460, 461, 462, 463

[56] References Cited

U.S. PATENT DOCUMENTS

| 1,630,974 | 5/1927 | Shelor et al. | 239/590.3 |
| 4,244,526 | 1/1981 | Arth | 239/553 |

FOREIGN PATENT DOCUMENTS

| 728819 | 4/1955 | United Kingdom . |
| 754528 | 8/1956 | United Kingdom . |
| 1443559 | 7/1976 | United Kingdom . |
| 1516732 | 7/1978 | United Kingdom . |
| 2008964 | 6/1979 | United Kingdom . |

Primary Examiner—Andres Kashnikow
Assistant Examiner—Karen B. Merritt
Attorney, Agent, or Firm—Blakely, Sokoloff, Taylor & Zafman

[57] ABSTRACT

The present invention provides a flow restricter for use in fluid flow systems, for example, shower head assemblies. The flow restricter comprises a conical member having a plurality of slotted openings along the length thereof. The slotted openings are in fluid communication with an outlet of a size desired to provide a limited flow through the restricter. The conical member in the preferred embodiment is upstream of the outlet opening. The use of a plurality of slotted openings to provide fluid communication to an outlet opening eliminates the possibility of single point failure of the present invention. The conical member is tapered so that, when disposed in a fluid delivery system, a contaminant reservoir is formed around the conical member. In this manner, ever when the reservoir is full of contaminant particles, water will flow through the contaminants without disrupting the flow requirements.

4 Claims, 3 Drawing Sheets

FLOW RESTRICTOR

BACKGROUND OF THE INVENTION

1. Field of the Invention

This invention relates to the field of flow restrictors for controlling and limiting fluid flow and in particular to a flow restrictor used in a showerhead assembly.

2. Background Art

In fluid transport systems, it is often desired to include a means of controlling or limiting the flow of fluid from an outlet. For example, in showerhead assemblies, it may be desired to control the rate of water flow from the showerhead by means of a flow restrictor. In water sensitive areas, in particular California and other western states, legislatively mandated flow rates may be imposed as a conservation measure. In such instances, it is mandatory to provide a flow restrictor that is nonremovable, so as not to defeat the ultimate goal of conservation of water.

In the prior art, flow restriction is typically achieved by providing a small orifice somewhere in the water delivery system to limit the maximum flow rate of the entire system to that of the orifice itself. However, there are several disadvantages associated with such a scheme.

Of primary concern is contaminant clogging of the orifice. Commercial water supply systems include a variety of particles and contaminants of various sizes. Contaminates of a size greater than the orifice would accumulate at the orifice, eventualy blocking it or so severely restricting the flow as to render the showerhead assembly inoperable.

One prior art method of dealing with the problem of contaminants is the use of a screened filter upstream of the restricting orifice. However, the screen can also become clogged with contaminants and must be cleaned frequently to maintain operation. In addition, the screen is an additional article of manufacture, adding to the cost and complexity of the showerhead assembly.

Another method of contaminant management is the use of a plurality of holes to avoid single point failure. However, each of a plurality of holes must be smaller than a single hole orifice in order to provide the same flow limiting capabilities. As a result, small contaminant particles will be blocked by the holes resulting in blockage.

Finally, the above methods all introduce high velocity vibration and accompanying noise levels to operation of the showerhead assembly. Such noise is undesireable and to be avoided.

Therefore, it is an object of the present invention to provide a flow restrictor for use in a fluid delivery system such as a showerhead assembly which will be free from clogging by contaminant particles.

It is another object of the present invention to provide a flow restrictor for fluid delivery systems and showerhead assemblies in which high velocity noises associated with its operation are reduced or eliminated.

It is a further object of the present invention to provide a flow restrictor for use in a fluid delivery system for a showerhead assembly which may be operated for long periods of time without user maintenance.

It is still another object of the present invention to provide a flow restrictor for use with a fluid delivery system or showerhead assembly which may be produced economically and with the minimum of complexity.

SUMMARY OF THE PRESENT INVENTION

The present invention provides a flow restrictor for use in fluid flow systems, for example, showerhead assemblies. The flow restrictor comprises a conical member having a plurality of slotted openings along the length thereof. The slotted openings are in fluid communication with an outlet of a size desired to provide a limited flow through the restrictor. The conical member in the preferred embodiment is upstream of the outlet opening. The use of a plurality of slotted openings to provide fluid communication to an outlet opening eliminates the possibility of single point failure of the present invention.

The conical member is tapered so that, when disposed in a fluid delivery system, a contaminant reservoir is formed around the conical member. In this manner, even when the reservoir is full of contaminant particles, water will flow through the contaminants without disrupting the flow requirements. Further, by making the slots smaller than the showerhead passages, the flow restrictor acts as a screen to prevent clogging of the entire showhead assembly down stream of the restrictor.

The present invention has equal application to any fluid flow assembly where particulate contamination is a problem. In particular, the present invention is useful as a replacement for screen filter type assemblies.

In the preferred embodiment of the present invention, the flow restrictor incorporates a threaded section used for the purpose of assembly, the flow restrictor being molded in a high grade engineering plastic (e.g. DELRIN), provides good assembly and moulding qualities resulting in low cost manufacture and simplicity of design. Because the flow restrictor can operate even with a full reservoir chamber of contaminant particles, little or no maintanence is required.

DETAILED DESCRIPTION OF THE PRESENT INVENTION

A flow restrictor for use in fluid delivery systems including showerhead assemblies is described. In the following description, certain specific or preferred details are set forth, such as number of slots, flow rate, etc., in order to provide a more thorough understanding of the present invention. It will be obvious, however, to one skilled in the art, that the present invention may be practiced without all of these specific or preferred details. In other instances, certain well known structures or features are described in general terms to assist in understanding the invention but such well known structures and features have not been described in great detail in order not to obscure the novel structure of present invention.

Figure 1:
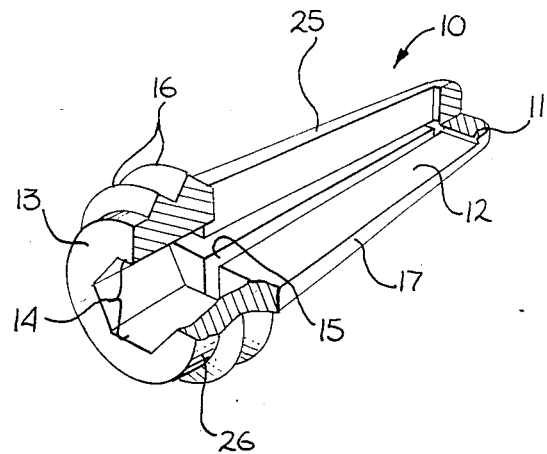
FIG. 1 is a perspective view showing the preferred emboidment of the flow restrictor of the present invention.

Referring to FIG. 1, the preferred embodiment of the present invention is illustrated and is generally represented by the numeral 10. The flow restrictor of the present invention comprises an integral structure which is generally conically shaped having a contaminant restricting means and flow restricting means identified by upstream section 25 and downstream section 26 respectively. Upstream section 25 is separated from downstream section 26 by threads 16. In addition to separating the upstream and downstream sections of the present invention, threads 16 also serve to seat and locate the flow restrictor 10 when installed as part of a fluid delivery system, such as a showerhead assembly.

Downstream section 26 includes circular face 13 extending from and concentric with threads 16. Although in the preferred embodiment, face 13 and threads 16 are described as being circular, it will be obvious that in opening 14 any suitable shape may be employed to meet the requirements of a fluid delivery system.

Face 13 includes opening 14 which is approximately centrally located and concentric with threads 16. Opening 14 is chosen to be of a size so that the maximum flow rate of fluid through opening 14 does not exceed a desired rate. As previously mentioned, certain states in the United States have enacted regulations for conserving water which set maximum flow rate limits for showerheads. For example, the California Energy Commission has set a maximum flow rate of three gallons per minute (GPM) at a pressure of 20 to 80 pounds per square inch (PSI). Therefore, by way of example, in California, circular opening 14 should have an area equivalent to a diameter of approximately 120 to 150 thousandths of an inch so that the maximum flow rate is three gallons per minute.

In typical commerical water supply systems, the water contains contaminant particles which can clog a flow restrictor opening, such as opening 14, or the flow channels of a showerhead assembly itself. The design of the flow restrictor of the present invention not only prevents clogging of the flow restrictor, but also prevents the passage of contaminant particles which can clog the flow channels of a showerhead assembly. This is achieved through the upstream portion 25 containing slotted openings 12 for introducing water to opening 14 of the flow restrictor 10.

As previously described, the upstream section 25 is substantially cone shaped, being wider adjacent threads 16 than at its extreme upstream end. Although the preferred embodiment of the present invention uses a conical shape, any suitable shape, such as cylindrical, rectangular or splined may be utilized with no difference in function. The upstream section 25 of the present invention includes slotted openings 12 providing fluid communication to a central channel 15 accessing opening 14. Slotted openings 12 are formed between sectional members 17 which define the cone shaped upstream section 25.

The slotted openings 12, in the preferred embodiment of the present invention, are made smaller than the flow channels of a showerhead assembly. In this manner, any contaminant particles passing through the slotted openings 12 will necessarily be smaller than the flow channels of a showerhead assembly, eliminating the possiblity of clogging of the flow channels. Of course, the slotted openings 12 are smaller than opening 14 so that clogging of opening 14 is prevented as well.

The upstream portion 25 of the present invention provides contaminant control with flow restriction being controlled by downstream portion 26. By providing the separation of functions, the upstream section 25 can be customized for a variety of applications without affecting the ability of the restrictor to control the flow rate of fluid. In the preferred embodiment of the present invention, the flow restrictor is mounted in, or formed integrally with, a swivel ball engaging the outer housing of a showerhead assembly. In application, the length of the downstream section 25 is such that it extends the length of the swivel ball. In this manner, a contaminant resevoir chamber is created around upstream section 25 which collects contaminant particles. The unique construction of the present invention is such that, even though the resevoir may be filled with contaminant particles, a flow path remains for fluid flow through slotted openings 12 and ultimately through opening 14.

Figure 3:
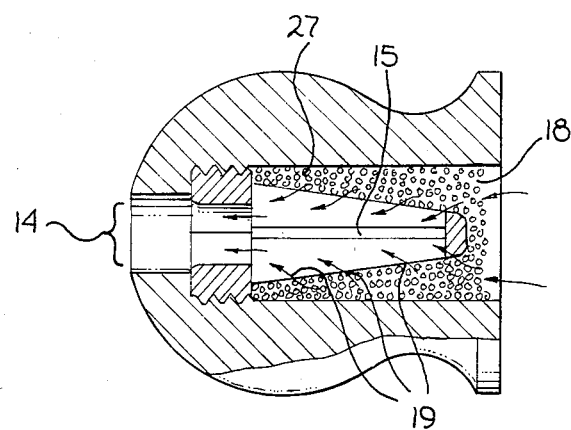
FIG. 3 is a side cross-sectional view of the flow restrictor of FIG. 2 in its assembly configuration.

The operation of the flow restrictor of the present invention is illustrated in FIG. 3. Although the present invention is described in conjunction with its use in a showerhead assembly, it will be obvious that the present invention has equal application to any fluid delivery system.

FIG. 3 illustrates the present invention in use as part of a fluid delivery system and disposed in a swivel ball 20. As can be seen from FIG. 3, upstream section 25 is tapered so that a resevoir 27 is formed about section 25. This resevoir 27 serves as a collection point for contaminant particles such as particles 18, which may be present in the fluid stream. Fluid enters the flow restrictor through slots 12 and through central channel 15 to upstream section 26 where it exits opening 14.

Figure 4:
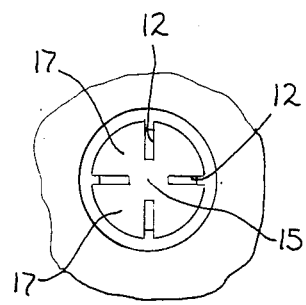
FIG. 4 is an end view of the flow restrictor of FIG. 3.

Referring briefly to FIG. 4, an end view of the present invention is shown. In the preferred embodiment of the present invention, the four slots 12 are formed in the upstream section 25. It will be obvious, however, that any suitable number of slots including a single slot may be utilized to achieve the purposes of the present invention.

Figure 2:
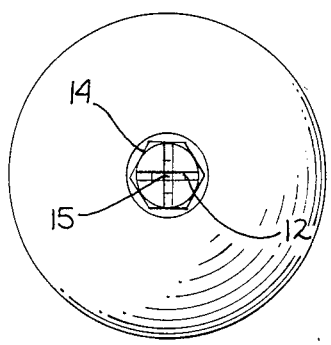
FIG. 2 is a front view of the preferred embodiment of the present invention.

Referring briefly to FIG. 2, a front view of the preferred embodiment of the present invention is illustrated. As previously discussed, the opening 14 is sized so as to limit the maximum flow rate to the desired level. The opening 14 accesses central channel 15 of a contaminant restrictor and may also access portions of the slots 12.

Referring again to FIG. 3, we see how the present invention eliminates the possibility of single point failure of the flow restrictor. Although the reservoir 27 may be full of contaminant particles, openings, such as openings 19, remain in the slots 12. In this manner, fluid may still enter the flow restrictor for ultimate delivery through opening 14. Any particles 18 in the reservoir 27 are necessarily larger than the slots 12. Thus, only contaminant particles smaller than the slots 12 will be passed through water delivery system to the showerhead. By sizing the slots 12 to be smaller than the flow channels of a showerhead, clogging of the showerhead by contaminant particles is also prevented. Thus, the present device prevents not only failure of the flow restrictor itself, but other downstream failures associated with contaminant particles.

In the preferred embodiment of the present invention, the flow restrictor is an integral molded part which may be conveniently and easily manufactured in large quantities from mouldable plastic, such as DELRIN, or other suitable materials. In addition, if desired, the present invention can be integrally molded with other parts while still acting as a flow restrictor.

Figure 5:
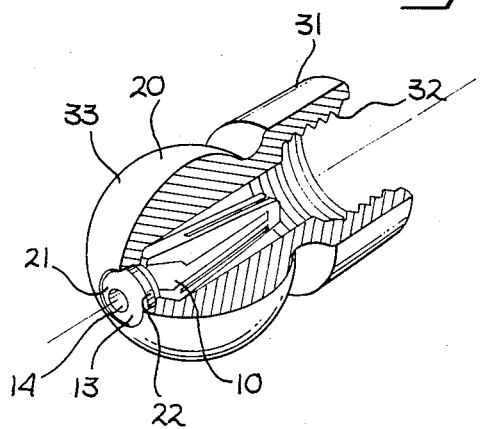
FIG. 5 shows an alternate method of mounting the flow restrictor of the present invention in a swivel ball of a showerhead assembly by use of a snap fitting.
Figure 6:
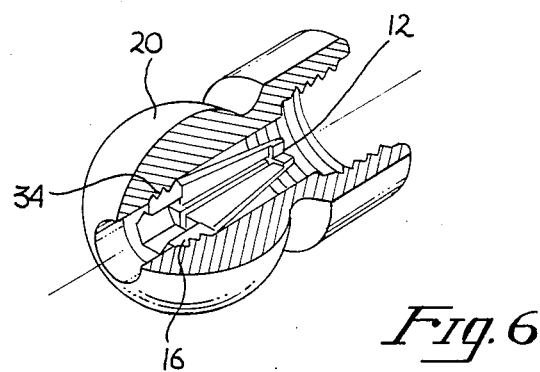
FIG. 6 illustrates a method of mounting the flow restrictor of the present invention in a swivel ball for use in a showerhead assembly using the thread feature.
Figure 7:
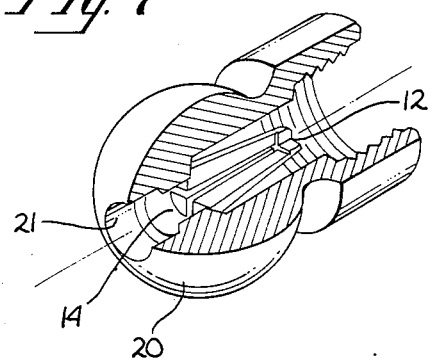
FIG. 7 illustrates an alternate method of moulding the flow restrictor of the present invention in a swivel ball of a showerhead assembly integrally.

Referring to FIGS. 5, 6 and 7, the present invention is shown disposed within a swivel ball assembly such as may be found in a showerhead assembly. The swivel ball 20 includes a collar 31 which provides access to a water delivery system. A showerhead housing is typically disposed on the spherical member 33 of swivel ball 20 which serves to both retain the housing and allow directional mobility of the showerhead. The collar 31 includes threaded members 32 so that the swivel ball 20 may be threadedly engaged with an outlet pipe or other water delivery system. Swivel ball 20 is hollow therethrough and includes opening 21 for introduction of water to the showerhead housing assembly.

In the preferred embodiment of the present invention, the flow restrictor 10 is threaded within the swivel ball assembly so that flow control may be maintained at the delivery point of the showerhead. In addition, by disposing the flow restrictor within the swivel ball, it becomes essentially nonremovable so as not to defeat the goal of water conservation.

In FIG. 5, the flow restrictor 10 is shown snapped into place in the swivel ball 20. This may be achieved by the simple pressure fit of the flow restrictor 10 such that flanges 22 provide sealing to restrict the passage of water except through opening 14 of flow restrictor 10.

In FIG. 6, the flanges 22 are replaced by threads 16 on the flow restrictor 10. The spherical member 33 includes threads so that flow restrictor 10 may be threadedly engaged to swivel ball 20. The threaded engagement is such that the flow of water around the restrictor 10 is prevented and water is directed to slots 12 for ultimately delivery through swivel ball 20.

The flow restrictor 10 of the present invention may also be integrally molded with the swivel ball 20 as shown in FIG. 7. Here, the swivel ball and flow restrictor are formed as a single unit. The diameter of opening 14 is chosen so as to restrict the flow of water through the swivel ball/restrictor assembly to the desired rate. The contaminant restrictor portion of the present invention remains conically shaped with slots 12 for allowing flow of water through the restrictor so as to exit the swivel ball 20 at opening 14 and ultimately opening 21.

Figure 8:
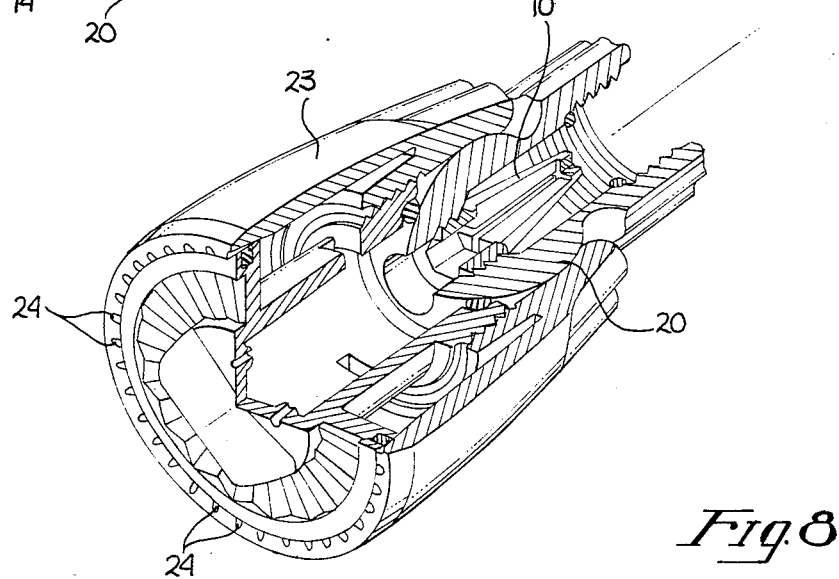
FIG. 8 illustates the flow restrictor of the present invention mounted in a showerhead assembly.
Figure 11:
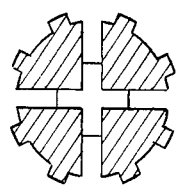
FIG. 11 is a cross sectional view of a splined contaminant restricting member.
Figure 10:
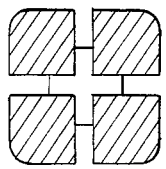
FIG. 10 is a cross sectional view of a square shaped contaminant restricting member.
Figure 9:
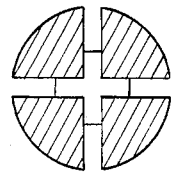
FIG. 9 is a cross sectional view of a conical shaped contaminant restricting member.

Referring to FIG. 8, the flow restrictor and swivel ball are shown disposed in a showerhead assembly housing 23. Although the present invention may be used with a variety of showerhead assemblies, it is shown in FIG. 8 with a showerhead assembly which is the subject of copending patent application No. 000435 filed Jan. 5, 1987, entitled "IMPROVED SHOWERHEAD APPARATUS" and assigned to the assignee of the present invention, the operation of which is incorporated herein by reference. In this particular example, the restrictor 10 is shown threadedly engaged with swivel ball 20. The showerhead housing 23 includes flow channels, the ends of which are identified by the number 24. By proper sizing of the slots 12 of the flow restrictor 10, clogging of flow channels 24 can be prevented by blocking the passage of contaminant particles larger than flow channel 24.

Thus, a flow restrictor has been described which prevents contamination, provides flow restriction, requires little or no maintenance and can be economically manufactured.

I claim:

1. In a shower head assembly including a swivel ball member having a bore for receipt of water therethrough and an attachment means for coupling said swivel ball to a water source, and other housing disposed about said swivel ball, said outer housing including a plurality of flow channels in fluid communication with said bore of said swivel ball, said flow channels for outputting a plurality of streams of water, said improvements comprising:

a flow restricter disposed within said coupled to said swivel ball, said flow restrictor having flow limiting means and contaminant restricting means;

said flow limiting means for limiting the flow of water through said flow restricter to a desired level, said flow limiting means comprising a hollow member having a channel formed there through said channel of such a size as to limit the flow of fluid there through to said desired level;

said contaminant restricting means comprising a conical member of decreasing diameter away from said flow limiting means having a plurality of slots formed therein, said slots being in fluid communication with said water source and said channel and adapted to prevent the passage of contaminant particles in said water source to said flow limiting means, said contaminant restricting means forming a reservoir with said bore of said swivel ball for collection of contaminant particles.

2. The improved showerhead assembly of claim 1 wherein said flow restrictor further includes threads formed on said flow limiting means for threaded engagement with said swivel ball.

3. The improved showerhead assembly of claim 1 wherein said flow restrictor is formed integrally with said swivel ball.

4. The improved showerhead assembly of claim 1 wherein said flow restrictor is snapped in place to said swivel ball.

* * * * *